June 17, 1941. B. S. WATLING 2,246,154
WEIGHING SCALE
Filed April 3, 1939 5 Sheets-Sheet 1
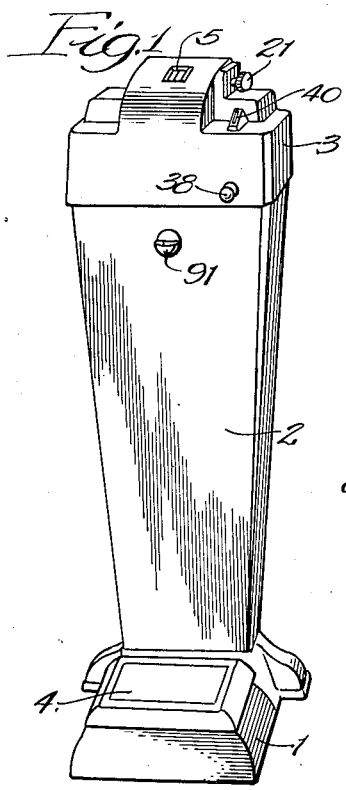
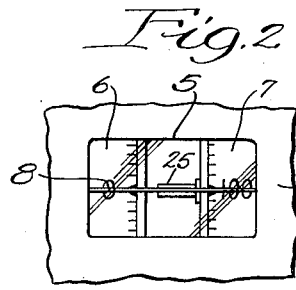
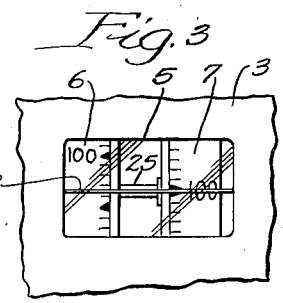
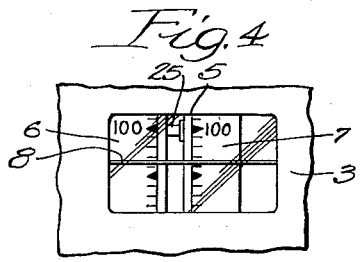
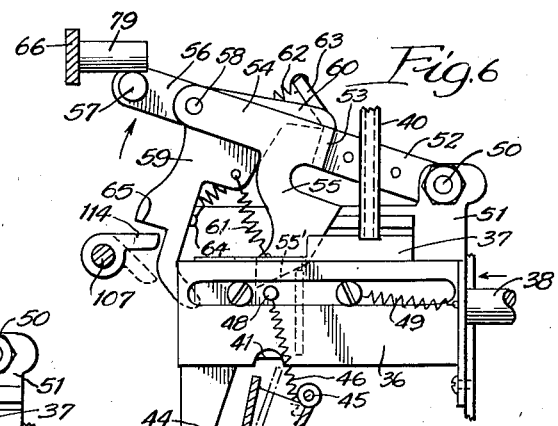
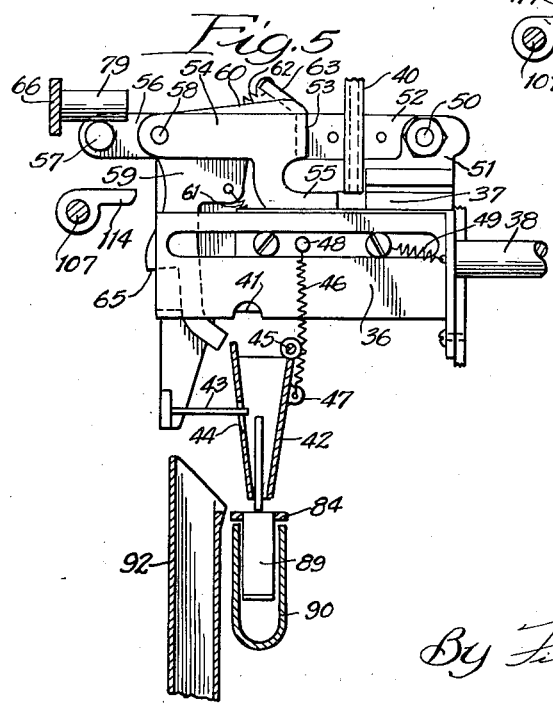
Inventor:
Burns S. Watling,
By Fisher, Clapp, Soans & Pond.
Attorneys.

Inventor:
Burns S. Watling,
By Fisher, Clapp, Soans & Pond,
Attorneys.

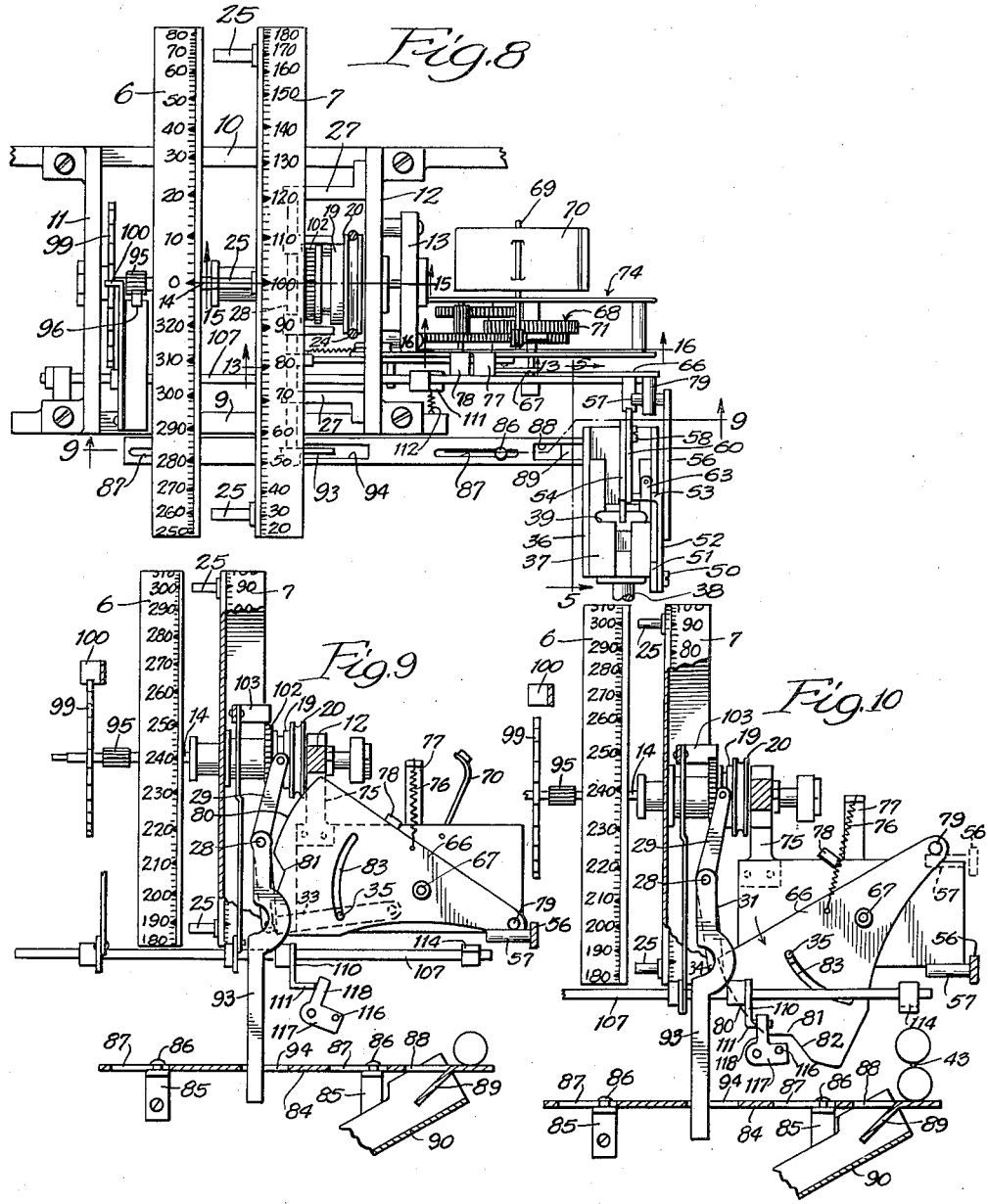

June 17, 1941.    B. S. WATLING    2,246,154
WEIGHING SCALE
Filed April 3, 1939    5 Sheets-Sheet 4
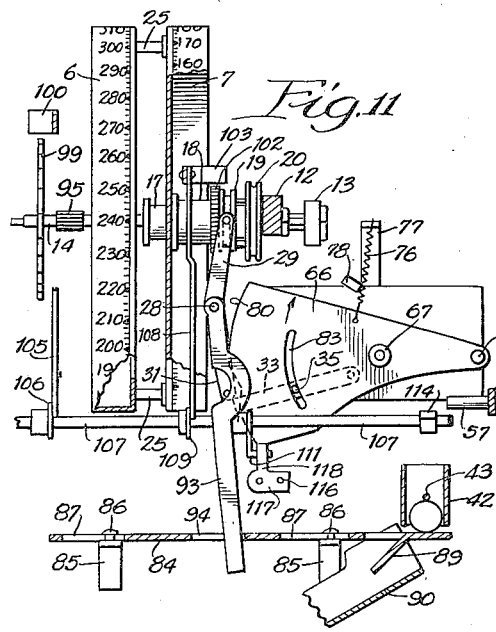
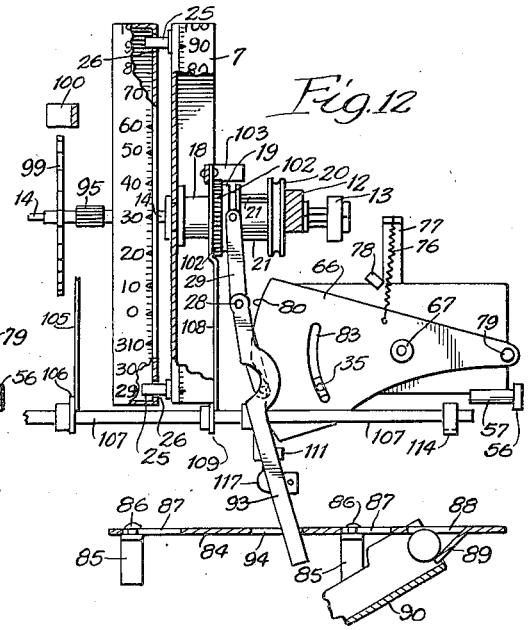
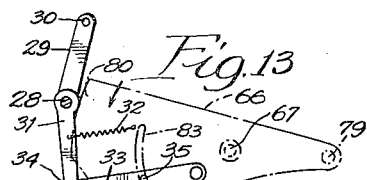
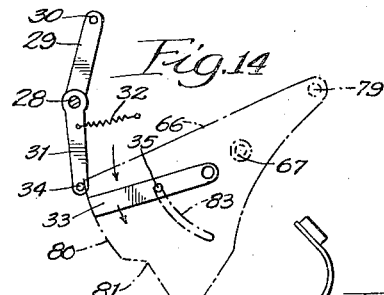
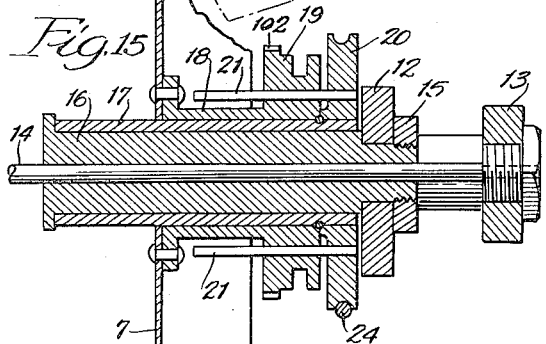
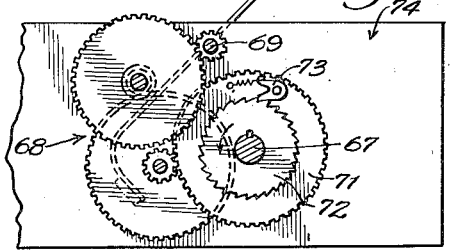
Inventor:
Burns S. Watling,
By Fisher, Clapp, Soans & Pond,
Attorneys.

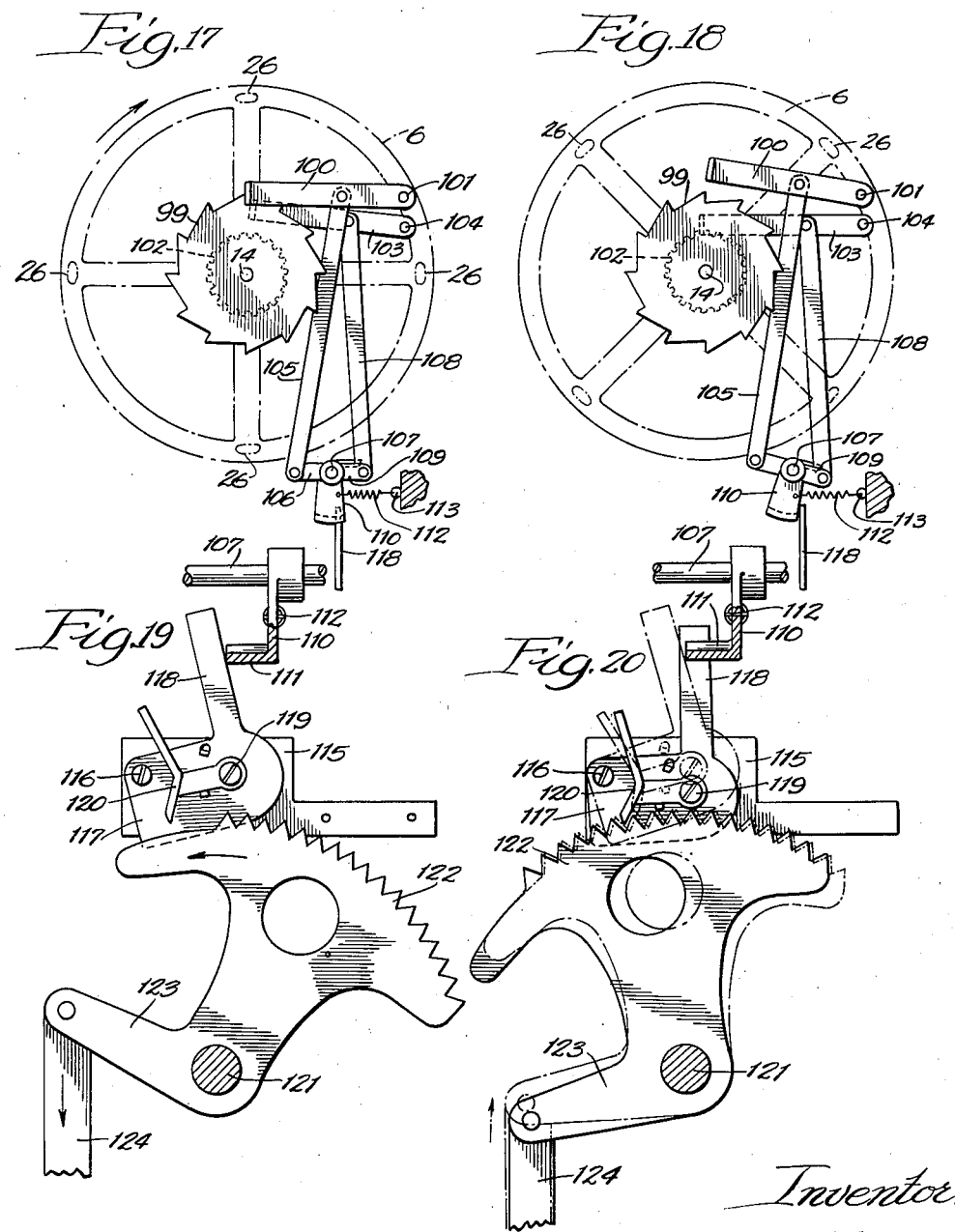

Patented June 17, 1941

2,246,154

UNITED STATES PATENT OFFICE 2,246,154

WEIGHING SCALE

Burns S. Watling, Chicago, Ill., assignor to Watling Scale Company, Chicago, Ill., a corporation of Illinois Application April 3, 1939, Serial No. 265,800

25 Claims. (Cl. 194—55)

This invention relates to weighing scales, and more particularly to a known type of coin-controlled scale wherein the customer or user is given an opportunity to estimate or guess his own weight, and if he guesses his weight correctly the coin is returned to him by the machine.

Scales of this type commonly employ a pair of scale discs, one of which is weight actuated while the other is manually set by the customer to his estimated weight before the weight actuated disc is released. If the weight indicating numbers or marks on the two discs tally or register with each other, the coin is returned. If they do not, the coin is sent to the coin box of the machine.

The general object of this invention has been to provide an improved scale of this character that will be thoroughly reliable in action; and another object has been to provide such a scale that will not require the customer or user to guess his weight within an ounce or fraction thereof in order to get his coin back, but will return the coin if the guessed weight falls within approximately a half pound of the real weight.

The scale of the present invention is based on the principle of mounting the two scale discs side by side and relatively slidable laterally toward and from each other, and providing one with one or more holes and the other with one or more pins of a size to enter said hole or holes when the discs are relatively shifted toward each other. If identical weight indicating marks on the two discs are directly opposite each other or substantially in register, the bodily shiftable disc will move far enough to cause the pin or pins to pass through the hole or holes, and this will cause the coin to be returned. If the weight indicating marks are not directly opposite each other or in substantial register the pins will not enter the holes but will be stopped by a solid portion or portions of the wall of the other disc, and this shortened shift of the bodily movable disc will cause the coin to be sent to the cash box of the machine.

An illustrative embodiment of the invention is shown in the accompanying drawings, in which—

Fig. 1 is a front perspective view of the scale.

Fig. 2 is an enlarged fragmentary view of the dial exposing window, showing the weight rotated disc at zero and the manually set disc at 100 pounds.

Fig. 3 is a similar view showing the weight rotated disc in a position in which the customer has missed correctly guessing his weight.

Fig. 4 is a similar view showing the weight rotated disc in a position in which the customer has correctly guessed his weight.

Fig. 5 is an elevation, partly in vertical section on line 5—5 of Fig. 8, of a coin-controlled dial detent release mechanism and a governor spring tensioning mechanism, showing the parts in normal idle position.

Fig. 6 is a view of Fig. 5, showing the parts in a position assumed after a coin has been deposited and the plunger pushed nearly to the limit of its in movement.

Fig. 8 is a top plan view of the mechanism shown in Fig. 7.

Figs. 9, 10, 11 and 12 are simplified views of the coin-controlled dial shifting mechanism, Fig. 9 being a section on line 9—9 of Fig. 8, and Figs. 9, 10 and 11 showing progressive positions of the parts where the customer has not guessed his weight, and Fig. 12 showing a position where he has guessed his weight.

Figs. 13 and 14 are views taken on the line 13—13 of Fig. 8 showing different positions of a pivoted stop arm that controls the dial shifting rock-shaft, a sector lever that lies in front of and controls the stop arm appearing in phantom.

Fig. 15 is an enlarged section taken on the line 15—15 of Fig. 8.

Fig. 16 is a section of the speed governor gear train on line 16—16 of Fig. 8.

Figs. 17 and 18 are end views of Figs. 9 and 10 respectively, showing dial detents and their operating mechanisms.

Figs. 19 and 20 are side elevations in different positions of a fraud preventing mechanism that controls the dial detent mechanism to maintain the manually set dial locked in its set position until the customer steps off the platform; these parts being viewed from the rear.

Figure 21:
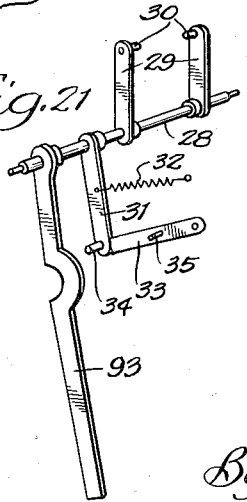

Fig. 21 is a perspective elevation of the rock-shaft control shown in Figs. 13 and 14.

Figure 22:
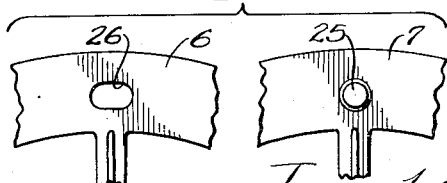

Fig. 22 is a fragmentary view illustrating the shapes and relative sizes of the pins and holes in the two dial discs.

Referring to the drawings, 1 designates the base, 2 the upright casing, 3 the cap or cover portion, and 4 the platform of an upright weighing scale of the general type disclosed in Letters Patent to T. W. B. Watling, No. 1,923,287, dated August 22, 1933. In the top wall of the cap 3 is a rectangular window 5, behind which are a pair of rotary scale discs 6 and 7 bearing on their peripheries weight indicating scale marks and numerals that are visible through the window 5, the latter being equipped with a central wire or hair line 8. The disc 6 is actuated by the weight of the customer, and the disc 7 is manually set by the customer at his estimated or guessed weight before he deposits his coin. Both the real and the guessed weights show directly beneath the line 8.

Figure 7:
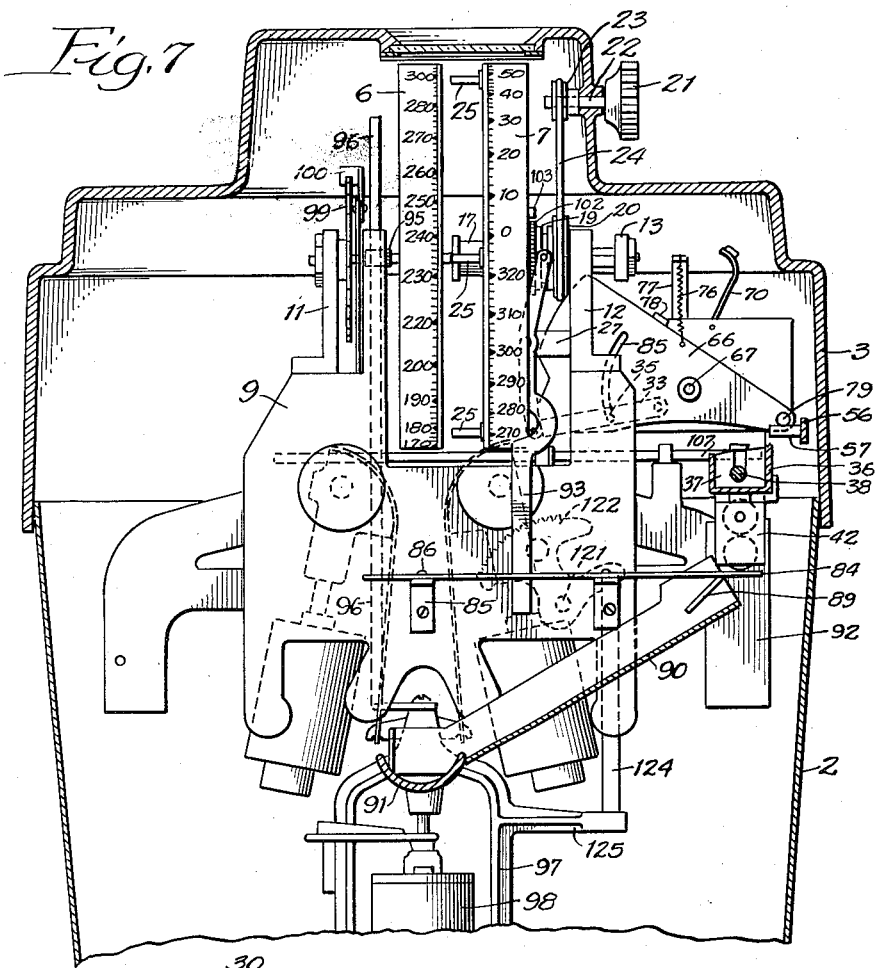
Fig. 7 is a front elevation, with the housing in section, of the dials and operating mechanism.

Within the casing and cap is a frame structure for supporting the cooperating movable parts, comprising mainly a pair of parallel upright plates 9 and 10 (Fig. 8), cross bars 11 and 12, and various auxiliary fixed frame members and brackets later referred to. Extending between and through the cross bars 11 and 12 and also through an auxiliary cross bar 13 (Fig. 15) is a rotary shaft 14 journaled at its ends in antifriction bearings in the bars 11 and 13. The weight-actuated disc 6 is keyed directly on shaft 14, while the manually set disc 7 is mounted in the manner best shown in Fig. 15. Mounted at its outer end in the bar 12 and secured by a nut 15 is a fixed sleeve 16 encircling the shaft 14, and encircling sleeve 16 is a bushing sleeve 17 that forms a bearing for a disc hub 18 to one end of which the disc 7 is secured. Integral with the outer end of hub 18 is a grooved collar 19, and journaled on the bushing sleeve 17 on the outer side of collar 19 is a pulley 20. Mounted in the pulley 20 are long pins 21 extending through holes in the collar 19, whereby rotation of pulley 20 is transmitted to disc 7 by means permitting lateral shift of the disc without breaking the driving connection. Referring to Fig. 7, pulley 20 is turned manually by a knob 21 fast on the outer end of a shaft 22 journaled in the cap 3, a pulley 23 fast on the inner end of shaft 22, and a belt 24.

On the inner face of disc 7 are four round pins 25 spaced 90 degrees apart, and in the opposed face of disc 6 are four holes 26 (see Fig. 12) also spaced 90 degrees apart. As shown in Fig. 22, the holes are slightly oblong in the direction of rotation of the disc with their major diameter greater than the diameter of the pins, so that if a customer has set disc 7 within approximately half a pound either side of his exact weight, when the disc 7 is shifted the pins will pass through the holes, as shown in Fig. 12, and a shift of disc 7 of this extent will bring into play mechanism by which his coin is returned to him. But if he fails to set disc 7 within half a pound of his exact weight, the shift of disc 7 will be limited by contact of the pins with the opposed wall of disc 6, and this will cause a coin to be sent into the cash box of the machine.

The disc 7 is shifted toward disc 6 by a spring that is locked against functioning until a coin has been deposited, and disc 7 is returned by a cam, as hereinafter described. Describing this disc shifting mechanism, journaled in and between a pair of brackets 27 (Fig. 8) is a rockshaft 28 located below and crosswise of the shaft 14, and fast on rock-shaft 28 are a pair of upstanding arms 29 (Fig. 21) carrying pins 30 that engage with the annular groove of collar 19. Also fast on rock-shaft 28 is a depending arm 31, to which is connected a pull spring 32. Obviously this spring tends to rock the shaft 28 in a direction to shift disc 7 toward disc 6. The action of spring 32 is, however, restrained, until a plunger carrying a deposited coin has been pushed in, by a pivoted stop arm 33 the free end of which abuts against arm 31 and temporarily renders the pull of spring 32 ineffective. The action of spring 32 is further controlled by a pivoted sector lever, later described, acting on a lateral pin 34 on the lower end of arm 31. On stop arm 33 is a lateral pin 35 through which the stop arm is disengaged from and re-engaged with the arm 31 at proper times by an arcuate slot in said sector lever, as later described.

Describing next a coin-controlled mechanism by which the rocking of shaft 28 and the shifting of disc 7 are controlled, and referring mainly to Figs. 5, 6, 7 and 8, slidably mounted in a fixed U-shaped casing 36 is a plunger 37, the operating stem 38 of which extends through the front wall of the housing cap 3. In the plunger is a transverse slot 39 that forms a temporary pocket for a coin dropping from a coin chute 40 (Fig. 1) as shown by dotted lines in Fig. 6, and in the bottom wall of casing 36 is a transverse slot 41 through which, when the plunger has been pushed fully in, the coin drops into a V-shaped guide 42 and comes to rest on a fixed pin 43 that projects through a hole 44 in a side wall of the guide. The guide 42 is pivotally suspended on a pin 45 beneath the plunger casing, and a pull spring 46 attached to a lug 47 on the guide and to a pin 48 on the plunger swings the guide between the vertical and inclined positions shown in Figs. 5 and 6 as the spring 46 crosses the pivot axis 45 of the guide. The plunger, when released, is returned to out position by a spring 49.

Pivoted at 50 on an upstanding lug 51 on one side wall of the plunger casing 36 is an arm comprising a straight rear portion 52, a lateral offset 53, and a straight forward portion 54. Integral with the lower edge of the forward portion 54 is a depending member 55 formed with an inclined lower edge 55' that functions as a cam when engaged by the top edge of the coin in the plunger when the latter is pushed in to raise the arm from the Fig. 5 position to the Fig. 6 position. Riveted to the outer side of the rear portion 52 of the arm and lying parallel with the latter is another arm 56 carrying on its free end a lateral pin 57 (see also Figs. 7, 9 and 10). Also pivoted at 58 on the free end of the arm member 54 is an elbow lever comprising a depending arm 59 and a rearwardly extending arm 60. The free end of arm 60 overlies the offset 53, as shown in Fig. 8. A pull spring 61 connecting the parts 55 and 59 holds the arm 60 down on the offset 53 and normally maintains parts 55 and 59 in the relative positions shown in Fig. 6; and another pull spring 62 anchored at its upper end to a lug 63 on the offset 53 and at its lower end to a pin 64 in a side wall of the plunger casing acts to draw the arms 52, 53, 54 and the parts carried thereby down to the Fig. 5 position and to cause the cam 55' to aid gravity in ejecting the coin through the discharge opening in the bottom wall of the plunger casing. On the outer edge of the arm 59 is a shoulder 65 which, as arm 59 descends actuates a rockshaft to release a detent normally locking disc 6 against turning and simultaneously apply another detent to lock disc 7 against turning, as hereinafter described. This mechanism, as to its detent release function, is closely similar to a coin and plunger operated mechanism disclosed in and forming in part the subject-matter of my Letters Patent No. 2,224,559, dated December 10, 1940.

Describing next a governor-controlled means that controls the inward shift of the disc 7 and effects its outward shift and is itself actuated in one direction by the pin 57 and in the reverse direction by a spring, and referring to Figs. 7 to 14 inclusive and Fig. 16, 66 designates a sector-shaped lever that is fast on the initial shaft 67 of a speed multiplying gear train designated as a whole by 68 (see Fig. 16), the final shaft 69 of the train having mounted thereon a wind vane 70. The initial gear 71 of the train is loose on shaft 67 and is driven in a clockwise direction only (viewing Fig. 16) by a ratchet 72 fast on shaft 67, and a pawl 73 pivoted on gear 71. The gear train is mounted in a rectangular frame designated as a whole by 74 which may be mounted in any suitable manner on the frame structure of the machine, it being shown in Figs. 8, 9 and 10 as bolted to the lower end of a leg 75 depending from the frame bar 12. This device is in the nature of a pneumatic governor for retarding and steadying the rising movement of the sector lever 66 from its Fig. 10 position to its Fig. 9 position, this rising movement being effected by a pull spring 76 that is anchored at its upper end to a post 77 on the governor frame and at its lower end to the wide arm of the sector lever. Pneumatic governors of this type for slowing and steadying the movement of a spring-impelled member are quite old and common, an example being shown in patent to John Watling, Racing game, No. 2,141,777, dated December 27, 1938. A stop lug 78 on the governor frame limits the rising movement of the sector lever. In the narrow or tail end of the sector lever is a lateral pin 79 that lies across the path of the pin 57 on arm 56, so that, when arm 56 is swung upwardly from its Fig. 5 position to its Fig. 6 position, the sector lever 66 is swung downwardly from its Fig. 9 position to its Fig. 10 position.

The end edge of the broad arm of the sector lever 6 is formed with an arc 80 struck from the pivot axis of the lever, a notch 81 at the lower end of the arc, and a cam 82 below the notch. The pin 34 on arm 31 overlies and cooperates with said arc, notch and cam. Also, in the broad arm of the sector lever is an arcuate slot 83 through which the pin 35 on stop arm 33 extends.

Describing next a mechanism by which the final disposal of the coins is effected, underlying the parts last described is a horizontal platform 84 (Figs. 5, 6, 7, 9, 10, 11 and 12) slidably supported on brackets 85 and guided by pins 86 engaged with longitudinal slots 87 in the platform. In the platform is a coin discharge slot 88, beneath which is an inclined runway 89 down which a coin in the guide 42 (Fig. 5) and resting on the platform may, when the platform has been shifted to the right to bring slot 88 into register with the open lower end of guide 42, as shown in Fig. 12, roll down into a customer's return chute 90 that delivers the coin to a cup 91 (Figs. 1 and 7). At one side of the upper end of chute 90 is a chute 92 (Figs. 5, 6 and 7) that delivers to the cash box of the machine. Fast on one end of rock-shaft 28 is a depending arm 93, the lower end of which extends through a longitudinal slot 94 in the platform 84. The length of this slot 94 is so related to the width of arm 93, that, under a turning movement of rock-shaft 28 only sufficient to shift disc 7 until its pins 25 strike the wall of disc 6, as shown in Fig. 11, arm 93 will play idly through slot 94, and platform 84 will not be shifted and the coin cannot be sent into return chute 90. But if the turning movement of rock-shaft 28 is sufficient to shift disc 7 to the Fig. 12 position wherein the pins 25 have entered the holes 26, the arm 93 will shift the platform sufficiently to effect the discharge of the coin into the return chute 90.

The weight actuated disc 6 is rotated in both directions from the scale platform by means of a pinion 95 fast on the shaft 14, and a vertical rack bar 96 (Fig. 7) which is secured at its lower end to the top of the usual vertically movable yoke 97 that straddles the dash pot 98 and is connected at its lower end to the scale platform.

Describing next the scale detent devices and their actuating means, and referring more particularly to Figs. 17 and 18, fast on the outer end portion of shaft 14 is a ratchet disc 99 with which cooperates a detent pawl 100 pivoted to the frame at 101. Formed integral with the collar 19 (Fig. 15) is a toothed disc 102, with which cooperates a detent pawl 103 pivoted at 104 to the frame. Pawl 100 is connected by a link 105 to a short arm 106 fast on a rock shaft 107, and pawl 103 is connected by a link 108 to a similar oppositely extending arm 109 fast on rock shaft 107. Also fast on rock shaft 107 is a depending leg 110 formed with a lateral foot 111 (Figs. 9, 10, 19 and 20). The leg 110 is urged to vertical position, in which detent pawl 100 is applied and detent pawl 103 is released, by a pull spring 112 anchored at 113 to the frame. From the foregoing it will be seen that when the rock shaft 107 is turned in one direction detent pawl 100 will be applied and detent pawl 103 simultaneously released; and when the rock shaft is turned in the reverse direction detent pawl 100 will be released and detent pawl 103 simultaneously applied.

In the normal idle position of the machine the pawl 100 is applied and the pawl 103 is released, as shown in Fig. 17, so that when the customer steps on the scale platform the weight-actuated scale disc 6 does not move until a proper coin has been deposited, but the disc 7 is free to be set manually at the estimated weight by manipulation of the knob 21.

Keyed on the rock shaft 107 is a trip finger 114 which is normally horizontal (Figs. 5 and 6) and lies across the path of travel of the shoulder 65 on the pivoted lever arm 59. As the latter is raised to Fig. 6 position it wipes idly across the end of finger 114, and as the shoulder 65 descends under the pull of spring 62, it strikes finger 114 lowering it to the dotted line position shown in Fig. 6, and thereby rocking the shaft 107 to the position shown in Fig. 18 to thereby release the detent 100 and apply the detent 103. Of course, the purpose of locking disc 7 in the position to which the customer has set it, is to prevent the latter from shifting it into weight-indicating register with the weight-operated disc 6 so as to get his coin back if he has failed to guess his correct weight. Detent 103 is itself locked in locking position so long as the customer remains on the scale platform by the following described device.

Referring to Figs. 7 and 17 to 20, 115 designates a bracket mounted on the frame on which is pivoted at 116 a dogging pawl comprising a plate 117 having on its upper edge an upstanding arm 118. Pivoted at 119 on plate 117 is a pallet 120. Pivoted on a stud 121 beneath the pallet 120 is a segment rack 122 formed with an arm 123 that is connected by a rigid link 124 to an arm 125 (Fig. 7) on the yoke 97, so that when a weight is applied to the scale platform the segment rack swings counter-clockwise viewing Fig. 19, and when the weight is removed the segment rack swings clockwise viewing Fig. 20. The operation of this device is described in the description of the operation of a complete cycle of the entire apparatus.

Describing the mode of operation, with the parts in the normal idle positions shown in Figs. 5, 7, 8, 9, 17, 19 and 21, the customer steps on the platform, sets the dial 7 to his guessed weight (for example 100 lbs. as shown in Fig. 3), drops a coin, and then pushes plunger 37 in. This raises arms 54 and 56 and pivoted detent release lever 59 to the Fig. 6 position and sets the sector lever 66 in Fig. 10 position, tensioning the governor spring 76. This swings the coin guide 42 to inclined position (Fig. 6) under the pull of spring 46 which has been swung to the other side of the pivot of the coin guide, so that the coin drops onto the horizontal pin 43, and the heel of lever arm 59 on which shoulder 65 is formed sweeps upwardly over the finger 114 on rock shaft 107. The plunger returns under the pull of its spring 49 to out position, and as the raised parts descend under the pull of spring 62, shoulder 65 (Fig. 6) strikes the finger 114 on rock shaft 107 and rocks the latter, which releases the detent 100 of the weighing scale disc 6 and applies the detent 103 of the manually turned disc 7 from Fig. 17 position to Fig. 18 position, so that the user's weight is visible through the window. At the same time, as the plunger returns to out position, the coin guide 42 is swung back by its spring 46 to Fig. 5 position, and the coin slides off the pin 43 onto the platform 84. The free end of stop arm 33 (Fig. 21) is normally abutting against the lower end portion of the spring urged arm 31 on the disc-shifting rock shaft 28; but as sector lever 66 approaches the end of its down swing (Fig. 10), the upper end of arcuate slot 83 strikes the lateral pin 35 on the stop arm 33 and pulls the latter out of engagement with arm 31. At this instant, pin 34 on arm 31 lies against the upper end of the arc 80 of the sector lever 66 (see Fig. 14) so that spring 32 cannot rock the shaft 28 to shift the disc 7 until pin 34 reaches and falls into the notch 81. This permits spring 32 to rock the shaft 28, and the upstanding arms 29 on shaft 28 (Fig. 21) push disc 7 to the left or toward the other disc 6, but arc 80 delays this action until disc 6 has come to rest. Now, the four pins 25 on disc 7 are so related to the four holes 26 in disc 6 that when identical weight-indicating numerals on the two discs are directly opposite each other (as shown in Fig. 4) the pins and holes will register and the pins will enter the holes, as shown in Fig. 12. If identical numerals are not directly opposite each other the pins will not enter the holes but will strike solid portions of the wall of the disc 6 and block any further shift of disc 7 toward disc 6, as shown in Fig. 11.

This latter occurs when the customer has failed to guess within one-half pound of his correct weight. Sector lever 66 now continues its rising movement from the Fig. 11 position to the Fig. 9 position under the pull of the governor spring 76. At the same time pin 34 rides over cam 82 on the wide end of the sector lever, thus shifting disc 7 back to its original starting position (Fig. 9), and the lower end of arcuate slot 83 strikes pin 35 and raises the stop arm 33 into re-engagement with the spring actuated arm 31 (Fig. 21).

As previously described, the lower end of the depending arm 93 that is fast on one end of the rock shaft 28 extends through the slot 94 in the slidable platform 84. If a customer has failed to guess his correct weight, as shown in Fig. 3 and by the position of the parts in Fig. 11, the platform is not moved and the coin cannot drop through the slot 88 in the platform, but the lower end of arm 93 plays idly through slot 94; and when the next coin is dropped and the plunger pushed in, the preceding coin, resting on the platform as shown in Fig. 5, is swept laterally by the guide 42 into the cash box chute 92. But if the customer has guessed his correct weight, then the platform is shifted by arm 93 from Fig. 11 position to Fig. 12 position, and the coin rolls down into the customer's return chute 90.

Describing the action of the detent locking device illustrated mainly in Figs. 19 and 20 in association with Figs. 17 and 18, the arm 118 of the dogging pawl normally abuts against the end edge of foot 111 when the machine is in idle position, as shown in Figs. 9, 17 and 19. But when shaft 107 has been rocked to the position shown in Figs. 10 and 18, the dogging pawl drops to the position shown in Fig. 10 and by full lines in Fig. 20 carrying the arm 118 behind a side edge of foot 111, and this locks rock shaft 107 in the position in which detent 100 has been released and detent 103 has been applied (Figs. 18 and 20), so that the customer on the platform cannot, after he has deposited his coin and pushed the plunger in, manipulate the manually set scale disc 7 so as to set it in weight-indicating register with the weight-actuated scale disc 6 with a view to ascertaining his weight and also getting his coin back.

When the customer steps on the scale platform, the segment rack 122 is swung clockwise viewing Fig. 7 and counter-clockwise viewing Fig. 19, but this merely rocks the pallet 120 idly without affecting the dogging pawl and detents. When the customer steps off the scale platform, the segment rack swings counter-clockwise viewing Fig. 7 and clockwise viewing Fig. 20, and its teeth cooperating with the pallet 120 push the dogging pawl plate 117 upwardly and this throws the arm 118 off the side edge of foot 111, as shown by dotted lines in Fig. 20, and permits spring 112 to restore the rock-shaft and detents to their normal idle positions shown in Figs. 9 and 17.

It will be observed that, while the customer who correctly guesses his weight gets back the identical coin he deposited, the cash box of the machine which gets the coins of customers who have failed to guess their correct weight, receives at each manipulation of the machine the coin deposited by the next preceding customer who has failed to guess his correct weight.

It will also be observed that both of the scale discs 6 and 7 are mounted in planes substantially at right angles to the front and rear walls of the housing or in a direction to turn toward and from the observer on the scale platform. This has the advantage of making the scale marks on the peripheries of the discs much easier to read as compared with the usual arrangement where the discs are mounted in planes parallel with the front and rear walls of the housing. So far as I am aware, this has never before been done in any weighing scale of the scale disc type.

Variations and changes in the details of structure and arrangement of parts may be made within the scope and coverage of the claims without departing from the invention or sacrificing any of the benefits and advantages thereof.

I claim:

1. In a weighing scale of the class described, the combination of a weight-actuated scale disc and a manually set scale disc mounted coaxial with said weight-actuated disc and bodily shiftable toward the latter, and disc shifting means including a rock-shaft, a spring for turning said rock-shaft, means for locking said rock-shaft against turning under the urge of said spring, and coin-controlled means for retracting said locking means.

2. In a weighing scale of the class described, the combination of a weight-actuated scale disc and a manually set scale disc mounted coaxial with said weight-actuated disc and bodily shiftable toward the latter, and disc shifting means including a rock-shaft, a spring for turning said rock-shaft, means for locking said rock-shaft against turning under the urge of said spring, coin-controlled means for retracting said locking means, and means for timing the action of said retracting means.

3. In a weighing scale of the class described, the combination of a weight-actuated scale disc and a manually set scale disc mounted coaxial with said weight-actuated disc and bodily shiftable toward the latter, and disc shifting means including a rock-shaft, an arm fast on said rock-shaft, a spring connected to said arm, a movable stop normally engaged with said arm to block the action of said spring, a pivoted member serving when swung in one direction to shift said stop out of engagement with said arm and when swung in the reverse direction to shift said stop back into engagement with said arm, a spring for swinging said pivoted member in one direction, and manually actuated coin-controlled means for swinging said pivoted member in the reverse direction and simultaneously tensioning said last named spring.

4. A specific embodiment of claim 3, wherein the pivoted member is pivoted between its ends and has on one end means engaged by the manually actuated coin-controlled means and on its other end means controlling the time and extent of movement of the disc shifting means.

5. A specific embodiment of claim 3, wherein the pivoted member is a sector-shaped lever having on its narrow end a pin liftingly engaged by the manually actuated coin-controlled means, and on its wide end means cooperating with the arm on the rock-shaft to control the time and extent of movement of the disc shifting means.

6. A specific embodiment of claim 3, wherein the pivoted member is a sector-shaped lever having on its narrow end a pin liftingly engaged by the manually actuated coin-controlled means, and on its wide end means cooperating with the arm on the rock-shaft to control the time and extent of movement of the disc shifting means, and wherein also the movable stop is a pivoted arm having a lateral pin and said lever has a slot the upper and lower ends of which cooperate with said pin to retract said pivoted arm from, and restore it to, blocking engagement with the spring-actuated arm fast on the rock-shaft.

7. In a weighing scale of the class described, the combination with a rotatable weight-actuated scale disc and a rotatable scale disc manually set to an estimated or guessed weight, of coin-controlled detents respectively controlling the rotation of said discs, and means for applying the detent of said manually set disc and simultaneously releasing the detent of said weight-actuated disc.

8. In a weighing scale of the class described, the combination with a rotatable weight-actuated scale disc and a rotatable scale disc manually set to an estimated or guessed weight, of coin-controlled detents respectively controlling the rotation of said discs, and means for simultaneously applying the detent of the manually set disc and releasing the detent of the weight-actuated disc and simultaneously applying the detent of the weight-actuated disc and releasing the detent of the manually set disc.

9. In a coin-controlled weighing scale of the class described, the combination of a shaft, a weight-actuated scale disc and a manually set scale disc mounted side by side on said shaft with capacity of relative movement toward and from each other, the opposed sides of said discs having the one a hole and the other a pin adapted to enter said hole when identical weight indicating scale marks on the two discs are in register with each other, mechanism for receiving and holding a coin, coin-controlled means for shifting one disc toward and from the other, and coin disposal means comprising a movable member for retaining the coin prior to its disposal, and a member actuated by said shifting means under a movement of the latter sufficient to carry said pin through said hole for effecting a coin discharging movement of said movable member; said movable member retaining the coin under a lesser movement of said shifting means.

10. In a coin-controlled weighing scale of the class described, the combination of a shaft, a weight-actuated scale disc and a manually set scale disc mounted side by side on said shaft with capacity of relative movement toward and from each other, the opposed sides of said discs having the one a hole and the other a pin adapted to enter said hole when identical weight indicating scale marks on the two discs are in register with each other, mechanism for receiving and holding a coin, spring-actuated means for shifting one disc toward the other, coin-controlled means controlling the action of said spring-actuated means, and coin disposal means comprising a movable member for retaining the coin prior to its disposal, and a member actuated by said spring-actuated shifting means under a movement of the latter sufficient to carry said pin through said hole for effecting a coin discharging movement of said movable member; said movable member retaining the coin under a lesser movement of said shifting means.

11. In a coin-controlled weighing scale of the class described, the combination of a shaft, a weight-actuated scale disc and a manually set scale disc mounted side by side on said shaft with capacity of relative movement toward and from each other, the opposed sides of said discs having the one a hole and the other a pin adapted to enter said hole when identical weight indicating scale marks on the two discs are in register with each other, mechanism for receiving and holding a coin spring-actuated means for shifting one disc toward the other, a pivoted member controlling the action of said spring-actuated means, coin-controlled means for swinging said pivoted member in one direction, a spring for swinging said pivoted member in the reverse direction, said spring being tensioned by said coin controlled means, and coin disposal means comprising a movable member for retaining the coin prior to its disposal, and a member actuated by said spring-actuated shifting means under a movement of the latter sufficient to carry said pin through said hole for effecting a coin discharging movement of said movable member; said movable member retaining the coin under a lesser movement of said shifting means.

12. In a coin-controlled weighing scale of the class described, the combination of a shaft, a weight-actuated scale disc and a manually set scale disc mounted side by side on said shaft with capacity of relative movement toward and from each other, the opposed sides of said discs having the one a hole and the other a pin adapted to enter said hole when identical weight indicating scale marks on the two discs are in register with each other, mechanism for receiving and holding a coin spring-actuated means for shifting one disc toward the other, a pivoted member controlling the action of said spring-actuated means, coin-controlled means for swinging said pivoted member in one direction, a spring for swinging said pivoted member in the reverse direction, said spring being tensioned by said coin-controlled means, a governor for slowing the movement of said pivoted member under the pull of said last named spring to afford time for said weight-actuated disc to come to rest, and coin disposal means comprising a movable member for retaining the coin prior to its disposal, and a member actuated by said spring-actuated shifting means under a movement of the latter sufficient to carry said pin through said hole for effecting a coin discharging movement of said movable member; said movable member retaining the coin under a lesser movement of said shifting means.

13. A specific embodiment of claim 9, wherein the weight-actuated scale disc is fixed against lateral movement and the manually set disc is shiftable laterally toward and from the weight-actuated disc.

14. In combination with claim 9, detents for the discs one of which is normally engaged while the other is disengaged, means for simultaneously releasing one detent and applying the other, and means for actuating said means.

15. In combination with claim 9, detents for the discs comprising ratchets fast with the respective discs, pivoted dogging pawls cooperating with the respective ratchets, a rock-shaft, oppositely extending arms on said rock-shaft, links connecting said arms to said pawls, and means for actuating said rock-shaft.

16. A specific embodiment of claim 9, wherein the coin disposal means includes a slidable coin platform having a coin discharge slot, means for confining a coin in a fixed position on said platform, a coin return chute beneath and normally out of register with said slot, and a platform shifting member itself actuated by the disc shifting means under a movement of the latter sufficient to carry the pin through the hole operating to bring said slot into register with the coin and said return chute.

17. A specific embodiment of claim 9 wherein the disc shifting means includes a rock-shaft, and the coin disposal means includes a slidable coin platform having a coin discharge slot, means for confining a coin in a fixed position on said platform, an arm fast on said rock-shaft having a lost motion connection to said platform, and a coin return chute beneath and normally out of register with said slot; the organization of said parts being such that a movement of the disc-shifting means insufficient to carry the pin through the hole idly swings said arm without shifting said platform, and a movement of the disc-shifting means sufficient to carry the pin through the hole operates to shift said platform and bring said slot into register with the coin and said return chute.

18. In combination with claim 9, detents for the discs one of which is normally engaged while the other is disengaged, means for simultaneously releasing one detent and applying the other, means for actuating said means, and weight-actuated means for locking the detent of the manually set disc in applied position during the portion of the weighing operation subsequent to the release of the weight-actuated disc.

19. In combination with claim 9, detents for the discs comprising ratchets fast with the respective discs, pivoted dogging pawls cooperating with the respective ratchets, a rock-shaft, oppositely extending arms on said rock-shaft, links connecting said arms to said pawls, a spring urging said rock-shaft in a direction to apply the detent of the weight-actuated disc and release the detent of the manually set disc, and weight-actuated means for locking the detent of the manually set disc in applied position during the portion of the weighing operation subsequent to the release of the weight-actuated disc, said weight-actuated locking means being automatically retracted by a reduction of the weight on the scale platform.

20. In a coin-controlled weighing scale of the class described, wherein, if the user guesses his correct weight the coin is returned to him and otherwise is sent to the coin box of the scale, the combination of a rotatable weight-actuated scale disc and a rotatable manually set scale disc mounted coaxially and relatively movable toward and from each other, mechanism for receiving and holding a coin, means controlling the extent of disc movement toward each other, coin-controlled means for shifting one disc toward and from the other, and means actuated by said disc shifting means controlling the disposal of the coin as between the user and the coin box and effecting return of the coin to the user under maximum shifting movement of the movable disc toward the other disc.

21. In a coin-controlled weighing scale of the class described, wherein, if the user guesses his correct weight the coin is returned to him and otherwise is sent to the coin box of the scale, the combination of a rotatable weight-actuated scale disc and a rotatable manually set scale disc mounted coaxially and relatively movable toward and from each other, mechanism for receiving and holding a coin, cooperating means on said discs controlling the extent of disc movement toward each other, coin-controlled means for shifting one disc toward and from the other, and means actuated by said disc shifting means controlling the disposal of the coin as between the user and the coin box and effecting return of the coin to the user under maximum shifting movement of the movable disc toward the other disc.

22. In a coin-controlled weighing scale of the class described, wherein, if the user guesses his correct weight the coin is returned to him and otherwise is sent to the coin box of the scale, the combination of a rotatable weight-actuated scale disc and a rotatable manually set scale disc mounted coaxial with said weight-actuated disc, one of said discs being bodily shiftable in axial direction toward and from the other, cooperating means on said discs controlling the extent of disc shift, mechanism for receiving and holding a coin, disc shifting means including a spring urging the shiftable disc toward the other disc, means normally locking said spring inactive, coin-controlled means for releasing said spring, and means actuated by said disc shifting means controlling the disposal of the coin as between the user and the coin box and effecting return of the coin to the user under maximum shifting movement of the movable disc toward the other disc.

23. In a coin-controlled weighing scale of the class described, wherein, if the user guesses his correct weight the coin is returned to him and otherwise is sent to the coin box of the scale, the combination of a rotatable weight-actuated scale disc and a rotatable manually set scale disc mounted coaxial with said weight-actuated disc, one of said discs being bodily shiftable in axial direction toward and from the other, cooperating means on said discs controlling the extent of disc shift, mechanism for receiving and holding a coin, disc shifting means including a spring urging the shiftable disc toward the other disc, means normally locking said spring inactive, means for retracting said spring locking means, coin-controlled means for actuating said retracting means, and means actuated by said disc shifting means controlling the disposal of the coin as between the user and the coin box and effecting return of the coin to the user under maximum shifting movement of the movable disc toward the other disc.

24. In a coin-controlled weighing scale of the class described, wherein, if the user guesses his correct weight the coin is returned to him and otherwise is sent to the coin box of the scale, the combination of a rotatable weight-actuated scale disc and a rotatable manually set scale disc mounted coaxial with said weight-actuated disc, one of said discs being bodily shiftable in axial direction toward and from the other, cooperating means on said discs controlling the extent of disc shift, mechanism for receiving and holding a coin, disc shifting means including a spring urging the shiftable disc toward the other disc, means normally locking said spring inactive, means for retracting said spring locking means, coin-controlled means for actuating said retracting means, means for moving the shiftable disc away from the other disc, and means actuated by said first named disc shifting means controlling the disposal of the coin as between the user and the coin box and effecting return of the coin to the user under maximum shifting movement of the movable disc toward the other disc.

25. In a coin-controlled weighing scale of the class described, wherein, if the user guesses his correct weight the coin is returned to him and otherwise is sent to the coin box of the scale, the combination of a rotatable weight-actuated scale disc and a rotatable manually set scale disc mounted coaxial with said weight-actuated disc, one of said discs being bodily shiftable in axial direction toward and from the other, cooperating means on said discs controlling the extent of disc shift, mechanism for receiving and holding a coin, disc shifting means including a spring urging the shiftable disc toward the other disc, means normally locking said spring inactive, means for retracting said spring locking means, coin-controlled means for actuating said retracting means, a spring actuated cam for moving the shiftable disc away from the other disc, means for returning said spring locking means to locking position, and means actuated by said first named disc shifting means controlling the disposal of the coin as between the user and the coin box and effecting return of the coin to the user under maximum shifting movement of the movable disc toward the other disc.

BURNS S. WATLING.